United States Patent [19]

Curry

[11] Patent Number: 5,620,289
[45] Date of Patent: Apr. 15, 1997

[54] COLORED STAPLES

[76] Inventor: Rinda M. Curry, 3391 Brookmeade St., Memphis, Tenn. 38127-6701

[21] Appl. No.: 599,037

[22] Filed: Feb. 9, 1996

[51] Int. Cl.$^6$ .................................. F16B 15/08
[52] U.S. Cl. ...................... 411/444; 411/903; 411/920
[58] Field of Search .................. 411/442, 444, 411/469, 473, 903, 920, 921; 206/345, 346, 347

[56] References Cited

U.S. PATENT DOCUMENTS

| | | | |
|---|---|---|---|
| 2,128,443 | 8/1938 | Vogel | 411/920 X |
| 2,522,656 | 9/1950 | Whalen | 411/920 X |
| 2,526,902 | 10/1950 | Ruglee | 411/444 X |
| 3,076,373 | 2/1963 | Matthews | 411/920 X |
| 3,894,174 | 7/1975 | Cartun | 411/920 X |

Primary Examiner—Neill R. Wilson

[57] ABSTRACT

Colored staples with color identification components are disclosed. A plurality of staples is provided. Each such plurality has a central section in a first plane and end sections in planes spaced parallel with each other and perpendicular to the first plane. The staples have a common cross-sectional configuration throughout the majority of their extents and are formed with points at the ends of their ends remote from their central sections. Each plurality of the staples has a generally rectangular cross-section with parallel interior and exterior faces and parallel lateral faces therebetween. A plurality of cylindrical sleeves, one for each staple, are provided. Each sleeve has an interior opening of a rectangular cross-sectional configuration of a size and shape corresponding to the cross-sectional configuration of the staples and mounted thereon to cover essentially the entire central section. The color of the sleeves are constant for the plurality of staples to assist in identification purposes.

4 Claims, 3 Drawing Sheets

COLORED STAPLES

BACKGROUND OF THE INVENTION

1. Field of the Invention

The present invention relates to new and improved colored staples and, more particularly, pertains to identifying staples and stapled sheets through colored identification components centrally coupled with respect to the staples.

2. Description of the Prior Art

The use of staples as well as color identification means of various designs and configurations is known in the prior art. More specifically, staples as well as color identification means of various designs and configurations heretofore devised and utilized for the purpose of identifying objects through colored indicia through various methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of devices for identifying staples and stapled sheets through colored identification components centrally coupled with respect to the staples. By way of example, U.S. Pat. No. 3,757,629 to Schneider discloses a resilient plastic staple.

U.S. Pat. No. 3,894,174 to Cartun discloses an insulated staple and method of making the same.

U.S. Pat. No. 4,014,244 to Larson discloses a flattened round end staple.

U.S. Pat. No. 4,655,222 to Florez et al. discloses a surgical staple having a surface which is coated with a low molecular weight fluorocarbon polymer.

U.S. Pat. No. 4,923,350 to Hinksman et al. discloses a laminated locking staple for use in detachable hose couplings or tube connections.

Lastly, U.S. Pat. No. Des. 330,699 to Gill discloses an insulated staple.

In this respect, the colored staples according to the present invention substantially departs from the conventional concepts and designs of the prior art, and in doing so provides an apparatus primarily developed for the purpose of identifying staples and stapled sheets through colored identification components centrally coupled with respect to the staples.

Therefore, it can be appreciated that there exists a continuing need for new and improved colored staples which can be used for identifying staples and stapled sheets through colored identification components centrally coupled with respect to the staples. In this regard, the present invention substantially fulfills this need.

SUMMARY OF THE INVENTION

In view of the foregoing disadvantages inherent in the known types of staples as well as color identification means of various designs and configurations now present in the prior art, the present invention provides improved colored staples. As such, the general purpose of the present invention, which will be described subsequently in greater detail, is to provide new and improved colored staples and methods which have all the advantages of the prior art and none of the disadvantages.

To attain this, the present invention essentially comprises new and improved colored staples with color identification components centrally coupled with respect thereto comprising, in combination, a plurality of staples, each having a short central section in a first plane and long end sections in planes spaced parallel with each other and perpendicular to the first plane, the staples having a common cross-sectional configuration throughout the majority of their extents and formed with points at the ends of their ends remote from their central sections, each of the staples having a generally rectangular cross-section with long parallel interior and exterior faces and short parallel lateral faces therebetween; a plurality of cylindrical sleeves, one for each staple, each sleeve having an interior opening of a rectangular cross-sectional configuration of a size and shape corresponding to the cross-sectional configuration of the staples and mounted thereon to cover essentially the entire central section, the color of the sleeves being constant for the plurality of staples to assist in identification purposes; a plurality of spaced projections on each sleeve and extending from adjacent sleeves and joining with adjacent projections of each next adjacent sleeve to constitute a separation region between staples of each plurality of staples; and a plurality of supplemental spaced projections on each staple located adjacent to the points extending from adjacent staples and joining with adjacent supplemental projections of each next adjacent staple to further constitute the separation region between staples of each plurality of staples.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide new and improved colored staples which have all the advantages of the prior art staples as well as color identification means of various designs and configurations and none of the disadvantages.

It is another object of the present invention to provide new and improved colored staples which may be easily and efficiently manufactured and marketed.

It is a further object of the present invention to provide new and improved colored staples which are of a durable and reliable construction.

An even further object of the present invention is to provide new and improved colored staples which are susceptible of a low cost of manufacture with regard to both materials and labor, and which accordingly are then susceptible of low prices of sale to the consuming public, thereby making such staples as well as color identification means of various designs and configurations economically available to the buying public.

Still yet another object of the present invention is to provide new and improved colored staples which provide in the apparatuses and methods of the prior art some of the advantages thereof, while simultaneously overcoming some of the disadvantages normally associated therewith.

Even still another object of the present invention is to identify staples and stapled sheets through colored identification components centrally coupled with respect to the staples.

Lastly, it is an object of the present invention to provide colored staples with color identification components. A plurality of staples is provided. Each such plurality has a central section in a first plane and end sections in planes spaced parallel with each other and perpendicular to the first plane. The staples have a common cross-sectional configuration throughout the majority of their extents and are formed with points at the ends of their ends remote from their central sections. Each plurality of the staples has a generally rectangular cross-section with parallel interior and exterior faces and parallel lateral faces therebetween. A plurality of cylindrical sleeves, one for each staple, are provided. Each sleeve has an interior opening of a rectangular cross-sectional configuration of a size and shape corresponding to the cross-sectional configuration of the staples and mounted thereon to cover essentially the entire central section. The color of the sleeves are constant for the plurality of staples to assist in identification purposes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
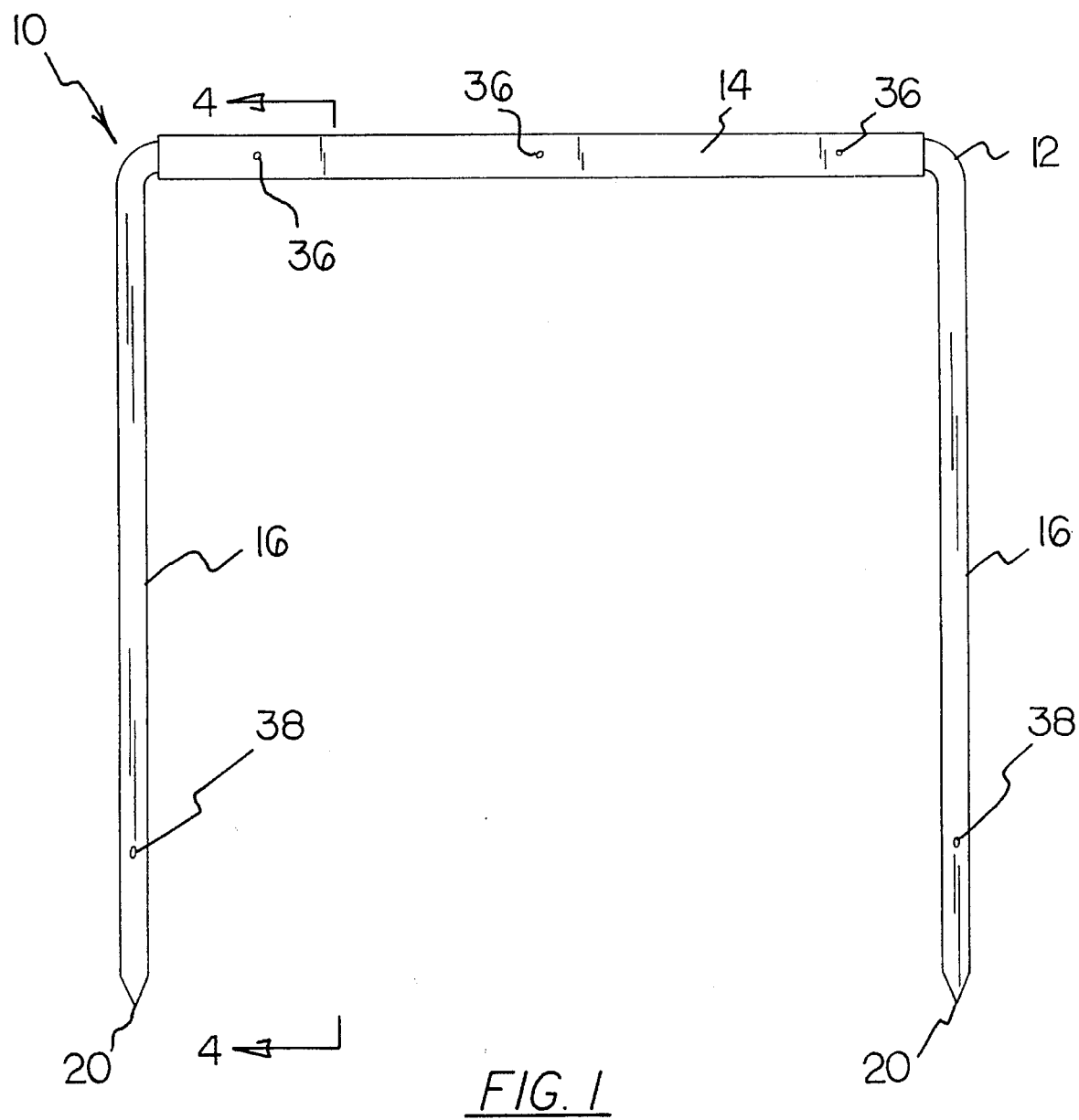
FIG. 1 is a front elevational view of the preferred embodiment of the new and improved colored staples constructed in accordance with the principles of the present invention.
Figure 2:
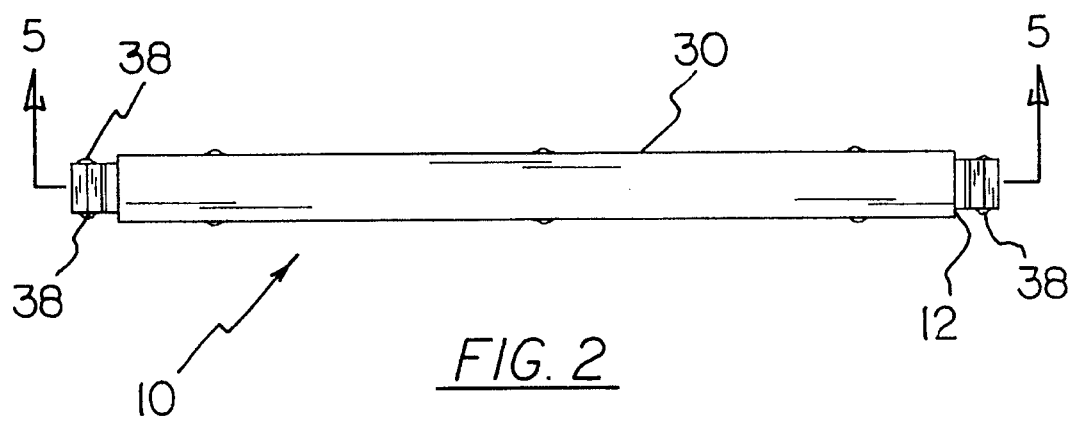
FIG. 2 is a top elevational view of the staple shown in FIG. 1.
Figure 3:
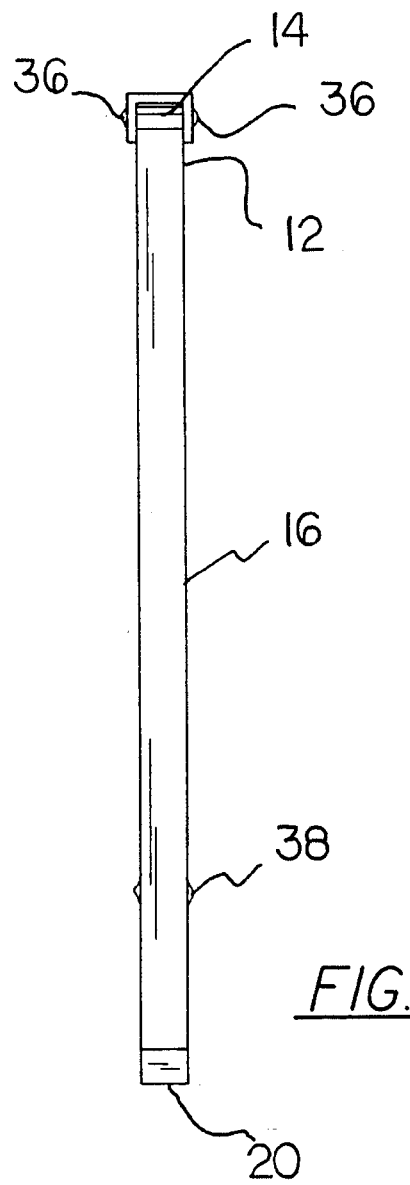
FIG. 3 is a side elevational view of the staple shown in FIGS. 1 and 2.

With reference now to the drawings, and in particular to FIG. 1 thereof, the preferred embodiment of the new and improved colored staples embodying the principles and concepts of the present invention and generally designated by the reference numeral 10 will be described.

The present invention, new and improved colored staples is a system 10 comprised of a plurality of components. In their broadest context, the components include a plurality of staples, a plurality of cylindrical sleeves, a plurality of spaced projections and a plurality of supplemental spaced projections. Each of the individual components is specifically configured and correlated one with respect to the other so as to attain the desired objectives.

Figure 6:
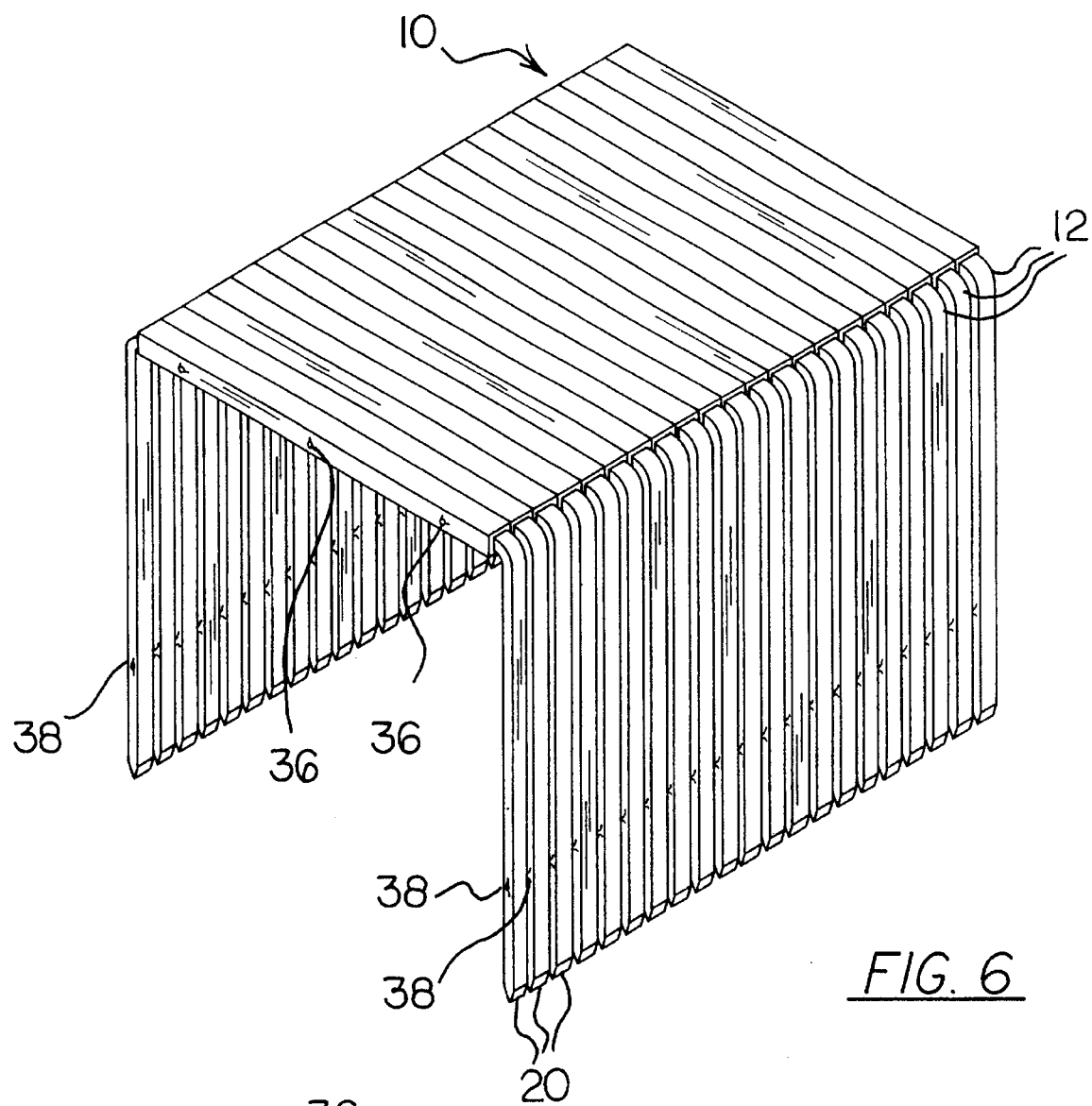
FIG. 6 is a perspective illustration of a plurality of staples of the type shown in the prior Figures but joined together in a plurality of staples for operation and use.
Figure 7:
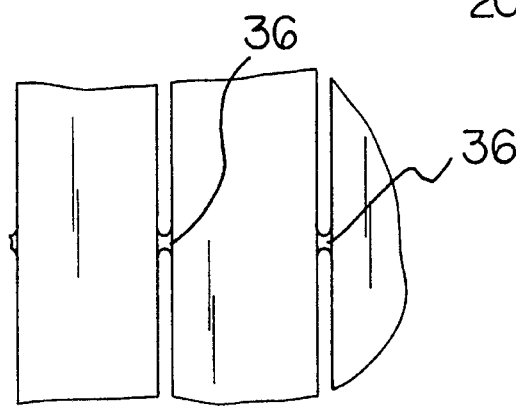
FIG. 7 is an enlarged elevational view of the projections coupling the sleeves of the prior Figure.
Figure 8:
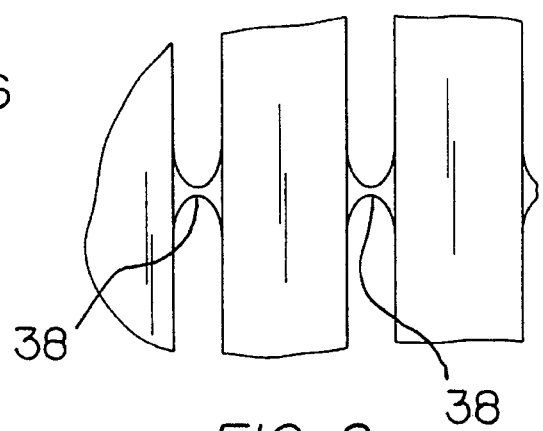
FIG. 8 is an enlarged elevational view of the projections coupling the staples of the prior Figures at locations adjacent to the points.

The group of staples coupled together as shown in FIG. 6 may be considered as a system 10. The plurality of such staples is formed of a plurality of individual staples 12 of an essentially identical construction. Each staple 12 has a short central section 14. When coupled together such short central sections lie in a first plane. Each of the staples also has similarly configured end sections 16. The end sections lie in second planes spaced parallel with each other. Such second planes are perpendicular to the first plane.

Figure 4:
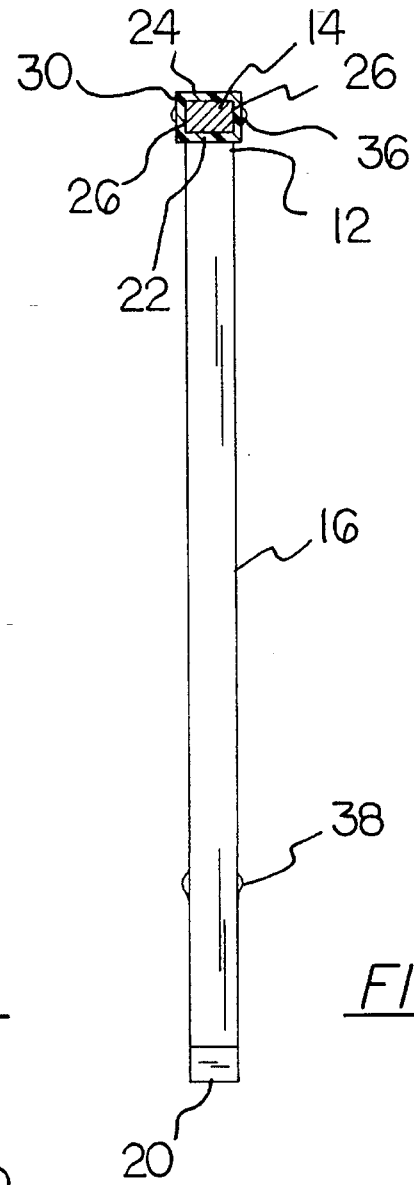
FIG. 4 is a cross-sectional view taken along line 4—4 of FIG. 1.
Figure 5:
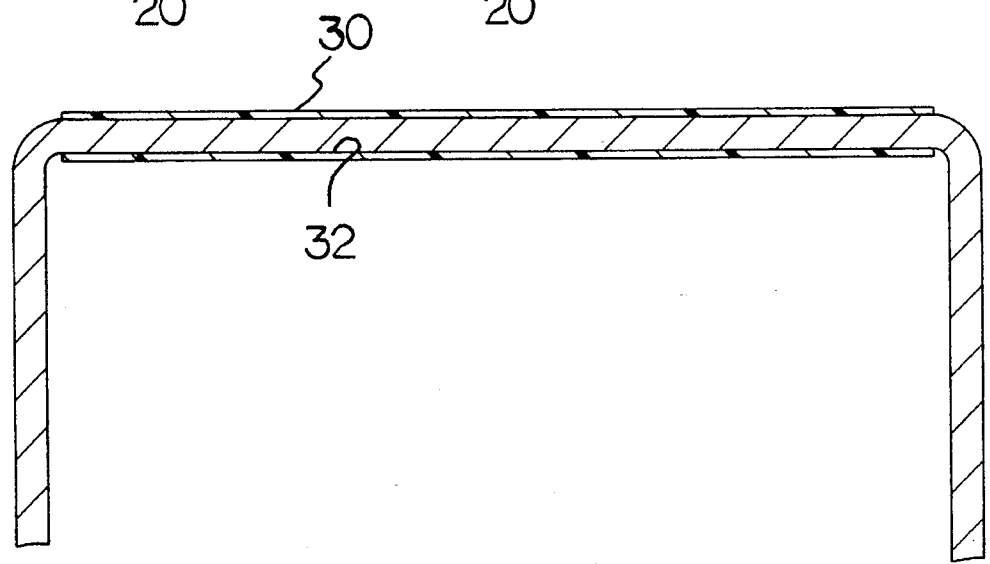
FIG. 5 is a cross-sectional view taken along line 5—5 of FIG. 2.

Each of the staples is shaped to have a common cross-sectional configuration throughout the majority of its extent. Each of the staples is formed with points 20 at the free ends of their ends remote from the central sections. Each of the staples also has a generally rectangular cross-sectional configuration. Note FIG. 4. Such cross-sectional configuration includes long parallel interior end exterior faces 22, 24 as well as short parallel lateral faces 26. The short lateral faces extend between the interior and exterior faces.

Next provided are a plurality of cylindrical sleeves 30. One sleeve is provided for each staple. Each sleeve has an interior opening 32. The interior opening is of a rectangular cross-sectional configuration with a size and shape corresponding to the exterior cross-sectional configuration of the staples in the central section. The exterior surface of each sleeve is also of a rectangular cross-sectional configuration to provide a common thickness throughout essentially the entire sleeve. The sleeves are mounted on the staples at the central sections to cover essentially the entire central section.

The color of each sleeve is the same through each plurality of staples as shown in FIG. 6. The common or constant color for the sleeve for any group of sleeves and any group of staples is to assist in identification purposes when the staples are deployed to couple sheets of paper or other material together.

Next provided are a plurality of spaced projections 36. Such projections are located on each sleeve. They extend outwardly therefrom from adjacent sleeves and join with adjacent similarly configured projections on each next adjacent sleeve. Such projections constitute a separation between staples of each plurality of staples. This is to assist in separating the staples one from another as they are being deployed for coupling sheets during operation and use. It is preferred that the plurality of spaced projections on each sleeve be formed of the same material as the material of the sleeve to facilitate fabrication. The material of the sleeves and associated projections is preferably a plastic of the type including polyethylene, polypropylene, polyvinylchloride (PVC), and like plastics.

Next provided are a plurality of supplemental spaced projections 38. Such supplemental spaced projections are located on each staple adjacent to the points. They extend from adjacent staples and join with adjacent supplemental projections on each next adjacent staple. Such supplemental spaced projections constitute a separation region between staples of each plurality of staples. The supplemental projections are of a greater length than the projections on the sleeves.

The supplemental projections are preferably formed of the same material as the material of the staples. Preferred materials include metals such as aluminum, steel, copper and like formable metals.

The staples and sleeves may be fabricated by first fabricating the staples and then adding the sleeves thereto as by a dipping process. In the alternative, the staples and sleeves may be separately fabricated and then coupling the sleeves to the staples. Further, the projections and supplemental projections may be formed with the staples and sleeves respectively and, in an alternative embodiment, the projections and supplemental projections may be added to the preformed staples and sleeves through a supplemental process.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. New and improved colored staples with color identification components centrally coupled with respect thereto comprising, in combination:

a plurality of staples, each having a short central section in a first plane and long end sections in planes spaced parallel with each other and perpendicular to the first plane, the staples having a common cross-sectional configuration throughout the majority of their extents and formed with points at the ends of their ends remote from their central sections, each of the staples having a generally rectangular cross-section with long parallel interior and exterior faces and short parallel lateral faces therebetween;

a plurality of cylindrical sleeves, one for each staple, each sleeve having an interior opening of a rectangular cross-sectional configuration of a size and shape corresponding to the cross-sectional configuration of the staples and mounted thereon to cover essentially the entire central section, the color of the sleeves being constant for the plurality of staples to assist in identification purposes;

a plurality of spaced projections on each sleeve and extending from adjacent sleeves and joining with adjacent projections of each next adjacent sleeve to constitute a separation region between staples of each plurality of staples; and a plurality of supplemental spaced projections on each staple located adjacent to the points extending from adjacent staples and joining with adjacent supplemental projections of each next adjacent staple to further constitute the separation region between staples of each plurality of staples.

2. Colored staples with color identification components comprising:

a plurality of staples, each having a central section in a first plane and end sections in planes spaced parallel with each other and perpendicular to the first plane, the staples having a common cross-sectional configuration throughout the majority of their extents and formed with points at the ends of their ends remote from their central sections, each of the staples having a generally rectangular cross-section with parallel interior and exterior faces and parallel lateral faces therebetween; and a plurality of linear cylindrical sleeves, one for each staple, each sleeve having an interior opening of a rectangular cross-sectional configuration of a size and shape corresponding to the cross-sectional configuration of the staples and mounted thereon to cover essentially the entire central section and leaving the end sections exposed, the color of the sleeves being constant for the plurality of staples to assist in identification purposes.

3. The device as set forth in claim 2 and further including:

a plurality of spaced projections on each sleeve and extending from adjacent sleeves and joining with adjacent projections of each next adjacent sleeve to constitute a separation region between staples of each plurality of staples.

4. The device as set forth in claim 3 and further including:

a plurality of supplemental spaced projections on each staple located adjacent to the points extending from adjacent staples and joining with adjacent supplemental projections of each next adjacent staple to further constitute the separation region between staples of each plurality of staples.

* * * * *